2,553,216

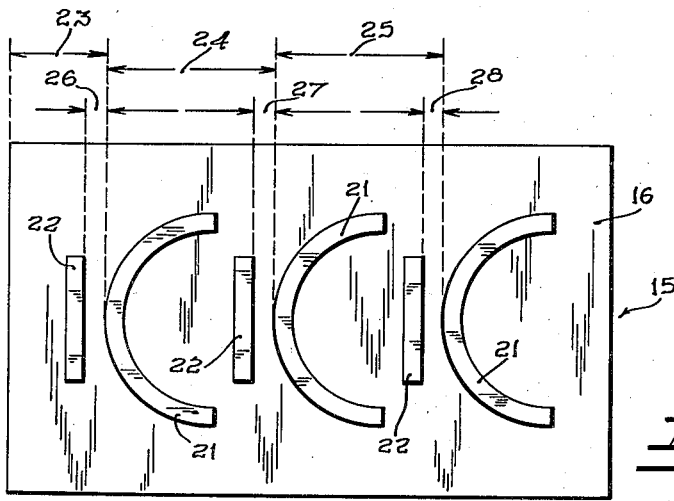
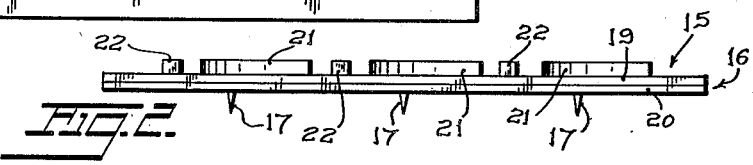
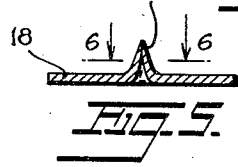
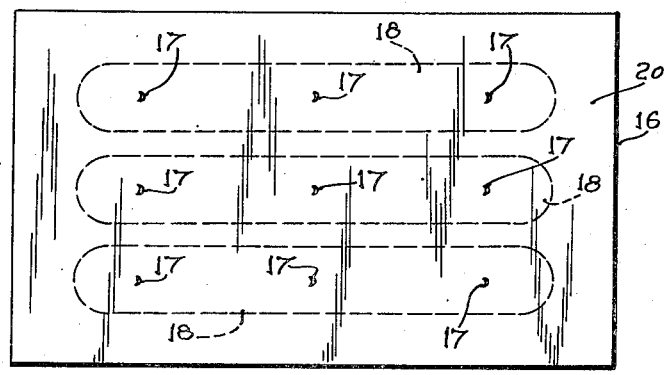
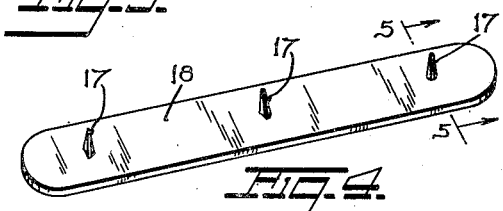
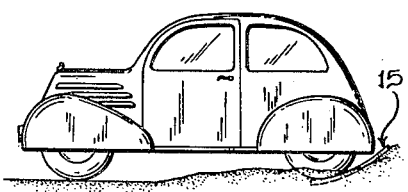
May 15, 1951 — W. D. SIMMONS — 2,553,216
MEANS FOR EXTRACTING CARS FROM RUTS, MUD, SNOW, AND THE LIKE
Filed June 23, 1948
INVENTOR.
WILBERFORCE D. SIMMONS
BY
ATTORNEY Patented May 15, 1951

UNITED STATES PATENT OFFICE 2,553,216

MEANS FOR EXTRACTING CARS FROM RUTS, MUD, SNOW, AND THE LIKE

Wilberforce D. Simmons, Mount Vernon, N. Y.

Application June 23, 1948, Serial No. 34,664

1 Claim. (Cl. 238—14)

This invention relates to new and useful improvements in devices for interposition when needed between the ground and an automotive vehicle, when such vehicle is stalled because its tractive wheels are in ruts, mud, snow, sand or the like or on an icy or other slippery surface.

The device of the invention, which is in the form normally of a flat elongate mat, and desirably of substantially rectangular outline, carries at its bottom a plurality of downwardly directed spaced spikes, and carries at its top a plurality of projections so specially shaped that as the spikes dig into the ground, to prevent slippage of the mat relative to the latter, said projections interlock with recesses in the tread portion of the wheel tire for giving the latter good traction on the mat.

Preferably, said spikes are struck-out portions of metal strips, and the strips are embedded in the main body of the mat, as by making such body of vulcanized rubber with the strips encased thereby. In order that the spikes can be of adequate height to dig deeply into the underwheel mass of material, whether the same be hard and slippery like ice or wet snow or fluent like boggy mud, deep sand or powdery snow, and also of great rigidity against bending, and yet integral with a strip made of fairly thin and flexible metal, thereby to permit the mat to have some longitudinal flexibility, said spikes, preferably, are specially shaped, so as to be of substantially arcuate cross-section from base almost to point.

As the invention is now further preferred to be carried out, said strips extend longitudinally of the mat, and, with each of them carrying say three spikes, there may be three of the strips present extended alongside each other but laterally spaced one from another, thereby to allow lateral flexibility in the mat, and so permit the mat to respond to a natural tendency to partially laterally embrace the wheel tire, thereby in turn to increase the efficacy of the tractive action of the wheel tire relative to the upper surface of the mat incidental to the setting up of a more intimate engagement of the projections on the top of the mat with the tire recesses.

As is well-known, the tread of a tire is provided with recesses which vary in type, shape and arrangement in tires of different makes. Nevertheless, the projections at the top of the mat as provided by the present invention are such that a device for the purpose explained is provided which is virtually of universal application, regardless of the type, shape and arrangement of the recesses of a tire tread.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure—

Fig. 1 is a top plan view of a now favored embodiment of the invention, that is, looking down on the same with its tire engaging projections uppermost.

Fig. 2 is a side elevation of Fig. 1.

Fig. 3 is a bottom plan view of Fig. 1.

Fig. 4 is a perspective view of one of the spike carrying strips, per se.

Fig. 5 is an enlarged detail view, this being a section taken on the line 5—5 of Fig. 4.

Fig. 6 is a similar view, but on a further enlarged scale, taken on the line 6—6 of Fig. 5.

Fig. 7 is an elevational view, showing the device in use.

Referring to the drawing more in detail, the new device, which generally is marked 15, comprises a main body portion in the form of a mat 16, the same being shown as an elongate rectangular slab of a suitable material, which latter is preferably vulcanized rubber.

Projected from the bottom of the mat 16 is a plurality of spikes 17, these shown, for instance, as nine in number, arranged in sets of three, each such set integral with a metal strip 18. Said strips, arranged say as indicated in Fig. 3, are suitably embedded in the mat 16, as, for example, by providing two like rubber sheets 19 and 20, see Fig. 2, with the strips 18 disposed on the lower sheet 20 with the spikes 17 lowermost and piercing said sheet, then superposing the sheet 19, and then vulcanizing the sheets and bonding them together marginally of the mat and along the longitudinal subdivisions of the mat between each adjoining two strips 18.

Carried at the top of the mat 16, and integrally formed therewith, or thus carried by the upper sheet of the mat if the latter is made of two sheets as just explained, are a plurality of substantially semi-circularly extending rib-like ridges 21. Alternating with the ridges 21 are straight bar-like cleats 22. The lines joining the termini of the ridges 21 extend transversely of the mat, and the directions of extension of the cleats 22 are also transverse to the mat. The curvature according to which a ridge 21 is extended is of such radius as substantially to match the radius of the tread portion of the inflated wheel tire laterally of the circumferential extension of the wheel. The mat 15 as herein shown may be assumed to be about 14" wide, in which case a desirable length for the mat would be 24".

Considering that the end of the mat 16 which is at the left in Fig. 1 is the bottom end thereof, that is, the end thereof which would be wedged in between a stalled wheel and the ground, a most efficient arrangement would be one according to which 4" is the distance between said bottom end of the mat and the first ridge 21 at the left in Fig. 1 (as indicated at 23); 6" is the distance between the last-named ridge 21 and the next one toward the right (as indicated at 24); 6" is the distance between the ridge 21 which is the second one from the left and the next one to the right (as indicated at 25); and 1" is the distance between each cleat 22 and the ridge 21 to the right of such cleat (as indicated, respectively, at 26, 27 and 28). These dimensions would be appropriate to a mat of the already mentioned over-all dimensions, that is, 24" x 14".

The ridges 21 and the cleats 22, at least at their portions at and somewhat below their crests, are desirably of substantially soft rubber, thereby increasing their capacity for automatic temporary resilient deformation in response to the type, shape and arrangement of the recesses of the wheel tire while the device is in use.

As will now be appreciated, a highly efficient, very inexpensive, light-weight and easily portable device is provided, of unique efficiency for the purpose intended. When an owner of an automobile driving the same finds himself unable to move the car, from ruts, sand traps, ice, etc., he places the device 15 as shown in Fig. 7, behind one of the power driven wheels of the car, with the spikes lowermost. Then the car is backed onto the mat, thus driving the spikes into the ice, sand or the like, giving the car a firm base and allowing it to be backed clear. The device is then retrieved, and the car drives off.

While I have illustrated and described the preferred embodiment of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

Means on the top face of a flexible rubber mat for use beneath the traction wheel of a motor vehicle for providing a grip for the tire of the traction wheel, comprising longitudinally spaced C-shaped rib-like ridges on the top face of the mat and having their greatest dimension extended parallel to the width of the mat, said C-shaped ridges having their open sides all facing one end of the mat, and elongated bar-like cleats on the top face of the mat between adjacent ridges and having their lengths extended parallel to the width of the mat, said bar-like cleats being of a length less than the distance across the open sides of said C-shaped ridges and being located midway of the ends of the open sides of said C-shaped ridges.

WILBERFORCE D. SIMMONS.

REFERENCES CITED

The following references are of record in the file of this patent:

UNITED STATES PATENTS

| Number | Name | Date |
| --- | --- | --- |
| 1,344,238 | Lavallee | June 22, 1920 |
| 1,732,975 | Lindner | Oct. 22, 1929 |
| 1,815,435 | Harding et al. | July 21, 1931 |
| 2,190,195 | Schivinc | Feb. 13, 1940 |
| 2,428,680 | Piatak | Oct. 7, 1947 |